Feb. 1, 1949.                    O. A. WIBERG                    2,460,558
                                  SLIDE RULE
Filed Oct. 8, 1945                                          2 Sheets-Sheet 1
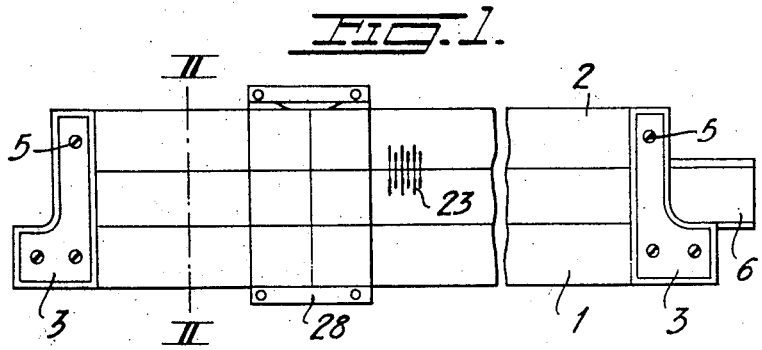
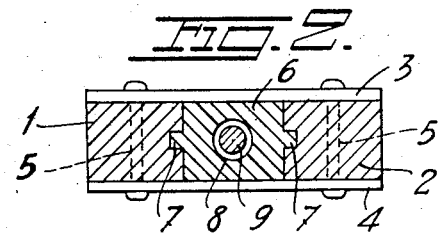
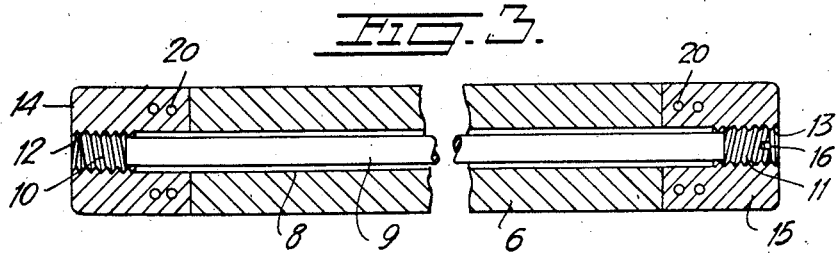
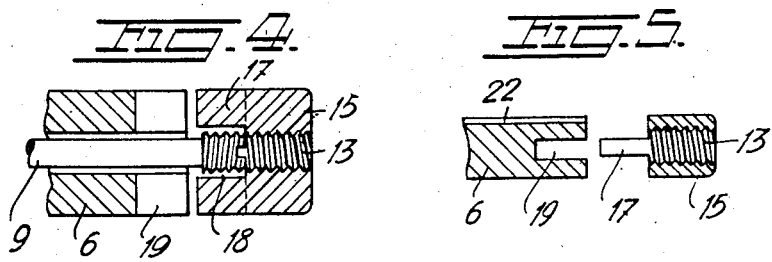
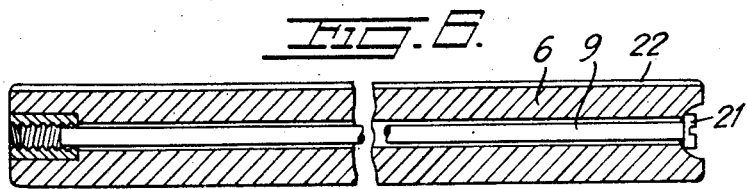
Inventor
Oscar A. Wiberg
by Sommers & Young
Attorneys Feb. 1, 1949.　　　　O. A. WIBERG　　　　2,460,558
SLIDE RULE
Filed Oct. 8, 1945　　　　　　　　　　　2 Sheets-Sheet 2
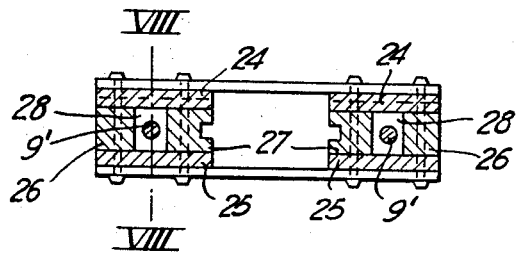
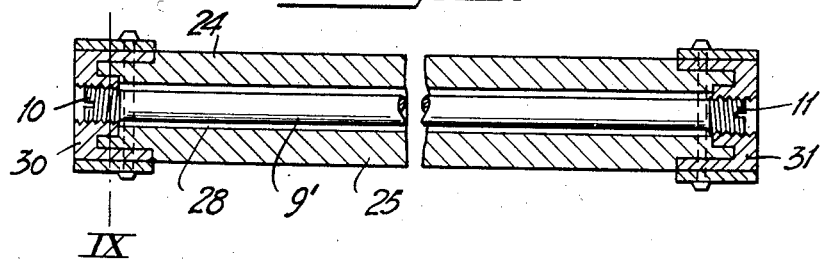
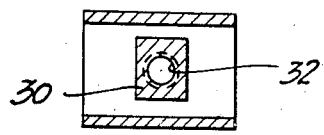
Inventor
Oscar Anton Wiberg
by Sommers + Young
Attorneys Patented Feb. 1, 1949

2,460,558

UNITED STATES PATENT OFFICE 2,460,558

SLIDE RULE

Oscar Anton Wiberg, Finspong, Sweden

Application October 8, 1945, Serial No. 620,915
In Sweden October 11, 1944

6 Claims. (Cl. 235—70)

1

The present invention relates to slide rules, and more particularly to that type of slide rules which comprises a rule body having a slideway and a slide mounted to reciprocate therein.

In such slide rules, it frequently happens that the relatively movable members are subjected to alterations of length due, for instance, to drying of the material of which said members are made. Where such alterations of length are different for the relatively movable members, they may cause a slight displacement of the graduations of said members with relation to each other, thereby rendering the computations inaccurate.

It is an object of the present invention to overcome these difficulties, and to this end a feature of the invention resides in the provision of means by which the relatively movable members of the slide rule may be lengthened or shortened by stretching or compressing the material thereof in the longitudinal direction of the rule in order thereby to restore the original accurate alinement between the graduations of the slide and those of the rule body or frame-work.

In the accompanying drawing Fig. 1 is a side elevation of a slide rule embodying this invention. Fig. 2 is a cross section on the line II—II of Fig. 1, taken on a larger scale. Fig. 3 is a horizontal longitudinal section of a form of slide. Fig. 4 illustrates the mounting of an end piece of the slide shown in Fig. 3. Fig. 5 is a vertical longitudinal section of the slide and end piece shown in Fig. 4. Fig. 6 is a longitudinal section of a somewhat modified form of slide. Fig. 7 is a cross section of one end piece of a further modified form of slide rule. Fig. 8 is a longitudinal section of the slide rule on a somewhat larger scale, taken along line VIII—VIII of Fig. 7, and Fig. 9 is a cross section on line IX—IX of Fig. 8 with certain parts removed.

The slide rule according to the invention is made principally of wood covered with Celluloid on the surfaces on which the markings are placed.

The slide rule illustrated is of the type in which the rule body consists of a frame-work comprising two longitudinal members 1 and 2, held in spaced relation to each other by means of a pair of transverse frame members 3, 4 at each end, connected together by means of screws or rivets 5. Mounted to reciprocate in the space between the rule members 1 and 2 is the slide 6 having tongues 7 on its opposite sides to engage longitudinal grooves formed in the inner sides of the side members 1 and 2. 28 designates the runner.

The slide 6 is provided with a longitudinal

2 central boring 8 through which extends a bolt 9 having oppositely directed threads 10 and 11 at both ends. Said threaded ends are screwed into correspondingly threaded borings 12, 13 of end pieces 14, 15 connected to the slide by rivets 20.

To adjust the length of the slide the bolt 9 is turned by means of a screw-driver engaging a groove 16 cut in one end of the bolt. By turning the bolt in one direction the material of the slide may be compressed in the longitudinal direction of the slide so as to shorten the slide, whereas by turning the bolt in the opposite direction the material of the slide may be allowed to expand longitudinally.

Fig. 4 illustrates how to connect the end pieces 14, 15 to the ends of the slide and to the threaded ends of the bolt 9. For this purpose each end piece is formed with a diametrically extending projection or key 17 on its inner end surface, said key having a central recess 18 to receive the respective end of the bolt. To receive this key 17 a groove 19 is cut in the respective end of slide 6, see also Fig. 5. In Fig. 5 numeral 22 indicates the Celluloid surface covering of the slide. In mounting, the bolt is first inserted into the boring 8 so as to project beyond both ends of the slide, and then the two end pieces 14, 15 are placed on the projecting ends of the bolt, so that the threads of the end pieces and those of the bolt are brought into engagement with each other, as shown in Fig. 4. By turning the bolt by means of a screw-driver in such a direction as to screw the end pieces on the ends of the bolt the end pieces are forced against the ends of the slide, thereby causing the key members 17 to enter the grooves 19. The end members are locked in this position by gluing and/or riveting them to the slide.

In the embodiment shown in Fig. 6 the bolt is threaded at one end only, the opposite end being provided with a head 21. By this means the slide can only be compressed longitudinally, this result, however, may be considered sufficient in the most cases to effect the adjustment required. Owing to the fact that the Celluloid surface covering 22 carrying the graduation shrinks, as a rule, more rapidly than the remainder of the slide, the stresses appearing between the two members may be equalized by tightening the screw bolt. Though not shown in the drawing, the head 21 of the screw bolt may be locked against axial displacement with relation to the slide, allowing the slide to be both compressed and stretched by turning the screw bolt.

Similarly, adjusting bolts embodying the invention, may be provided also in one or both rule members of the frame-work. In case of a slide rule of conventional type including a one-member body provided with a longitudinal slide-way or groove to receive the slide, the slide and/or one or both sides of said body member may be provided with adjusting bolts.

With the means described it is possible to obtain a high degree of accuracy. In order that such high degree of accuracy may be utilized in effecting computations it is necessary that the graduations contain more divisions than usual for each unit of length. Furthermore, such divisions need be represented by more thin lines next to the bearing surfaces between the slide and the rule body while for the rest the lines may be of normal thickness, as indicated at 23 in Fig. 1. The heavier portions of such division lines may be read with the naked eye, whereas the final adjustment is effected while observing the thin portions of the divisions through a magnifying-glass.

In Figs. 7-9 is shown a slide rule having two parallel bolts 9' each mounted in a separate one of the longitudinal members of the frame-work. Each such frame member comprises four parts, viz. an upper member 24, a lower member 25, and two sides 26 and 27, said four members being so arranged with relation to each other as to form a longitudinally extending channel 28 between themselves through which the respective bolt 9' extends. The bolt 9' is threaded at its ends to engage threaded borings of end pieces 30 and 31 of a modified structure. In Fig. 9 the end piece 30 is shown in cross section with its threaded boring indicated at 32.

What I claim is:

1. A slide rule comprising in combination, one or more rules having a slide-way and provided with graduations at the margins of said guide-way, a slide adapted to reciprocate in said slide-way, and means for lengthening or shortening said members with relation to each other by exerting a longitudinal stretching or compressing action thereon in order to effect accurate alinement of the graduations of the rule or rules with a graduation of the slide.

2. A slide rule comprising a frame-work having a slide-way and a slide reciprocable in said slide-way, and a threaded bolt positioned in a longitudinally extending channel in said frame-work or slide, said bolt being so connected with end portions of the frame-work or slide as to effect a change of length of the frame-work or slide as a result of a rotation of the bolt.

3. A slide rule as claimed in claim 2, in which the ends of the bolt are provided with oppositely directed threads adapted to engage corresponding threads formed in borings of the end portions of the frame-work or slide, so that a turning of the bolt in the one direction may effect a longitudinal compression and a turning of the bolt in the other direction may effect a stretching of the frame-work or slide.

4. A slide rule as claimed in claim 2 and in which the ends of the bolt are provided with oppositely directed threads adapted to engage corresponding threads formed in borings of the end portions of the frame-work or slide, characterized by the further feature that said end pieces are separate members attached to the frame-work or the slide by means of a slot and tongue engagement and secured in this engagement by gluing and/or riveting.

5. A slide rule as claimed in claim 2, in which one end of the bolt is provided with a thread adapted to engage a thread at one end of the frame-work or slide, the other end of the bolt being secured to the other end of the frame-work or slide, in order that a turning of the bolt in the one direction or the other may effect a longitudinal compression or stretching of the frame-work or the slide.

6. A slide rule as claimed in claim 2, in which the frame-work or each side member thereof consists of a plurality of interconnected members so arranged with relation to each other as to form a longitudinally extending space between themselves adapted to receive the bolt.

OSCAR ANTON WIBERG.

REFERENCES CITED

The following references are of record in the file of this patent:

UNITED STATES PATENTS

| Number | Name | Date |
|--------|------|------|
| 651,142 | Keuffel | June 5, 1900 |
| 694,258 | Dennert | Feb. 25, 1902 |
| 907,373 | Keuffel | Dec. 22, 1908 |
| 1,488,686 | Keuffel | Apr. 1, 1924 |